United States Patent
Bradski

(10) Patent No.: US 7,429,996 B2
(45) Date of Patent: Sep. 30, 2008

(54) APPARATUS AND METHOD FOR SENSING DEPTH IN EVERY DIRECTION

(75) Inventor: Gary R. Bradski, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 571 days.

(21) Appl. No.: 10/197,347

(22) Filed: Jul. 16, 2002

(65) Prior Publication Data

US 2004/0051782 A1    Mar. 18, 2004

(51) Int. Cl.
*H04N 7/00* (2006.01)
(52) U.S. Cl. .......................... 348/36; 348/37
(58) Field of Classification Search ............ 348/36, 348/335, 37; 356/5.01
See application file for complete search history.

(56) References Cited

U.S. PATENT DOCUMENTS

| | | |
|---|---|---|
| 4,199,253 A | 4/1980 | Ross |
| 4,393,394 A | 7/1983 | McCoy |
| 4,935,616 A | 6/1990 | Scott |
| 5,200,793 A | 4/1993 | Ulich et al. |
| 5,497,188 A * | 3/1996 | Kaye ............................ 348/36 |
| 5,760,826 A | 6/1998 | Nayar |
| 6,057,909 A | 5/2000 | Yahav et al. |
| 6,084,659 A * | 7/2000 | Tulet et al. ................... 356/5.01 |
| 6,091,905 A | 7/2000 | Yahav et al. |
| 6,100,517 A | 8/2000 | Yahav et al. |
| 6,118,474 A * | 9/2000 | Nayar ........................... 348/36 |
| 6,426,774 B1 * | 7/2002 | Driscoll et al. ............... 348/335 |
| 6,791,598 B1 * | 9/2004 | Luken et al. ................... 348/36 |

OTHER PUBLICATIONS

3DV, Products, "Zcam add-on", Apr. 2, 2002, 1 page, http://www.3dvsystems.com/products/products.html.
3DV, Technology, "Zcam add-on", Apr. 2, 2002, pp. 1-4, http://www.3dvsystems.com/technology/technology.html.
Lok, et al., "A Remote Controlled Vehicle with Omnidirectional Sensor", Paraover, CUCS-003099, Feb. 1999, pp. 15, Department of Computer Science, Columbia University, New York, NY 10027, U.S.A.
Iddan, et al., "3D Imaging In The Studio (And elsewhere . . . )", Abstract, 8 pages, 3DV Systems Ltd., Yokneam, Israel, www.3dvsystems.com.

* cited by examiner

*Primary Examiner*—Allen Wong
(74) *Attorney, Agent, or Firm*—Blakely, Sokoloff, Taylor & Zafman LLP

(57) ABSTRACT

An imaging system configured to take panoramic pictures is disclosed. In one embodiment, the imaging system includes a camera, range finder associated with the camera and configured to provide depth information for objects within a field of view of the camera; and a processor coupled to receive information from the camera and depth information from the range finder, and configured to unwrap pictures taken by the camera according to the depth information.

19 Claims, 14 Drawing Sheets

IMAGER PIXEL VALUES   　　　　　　　　　　TRIGGER THRESHOLD REACHED

I　　　　　　　　II　　　　　　　　III

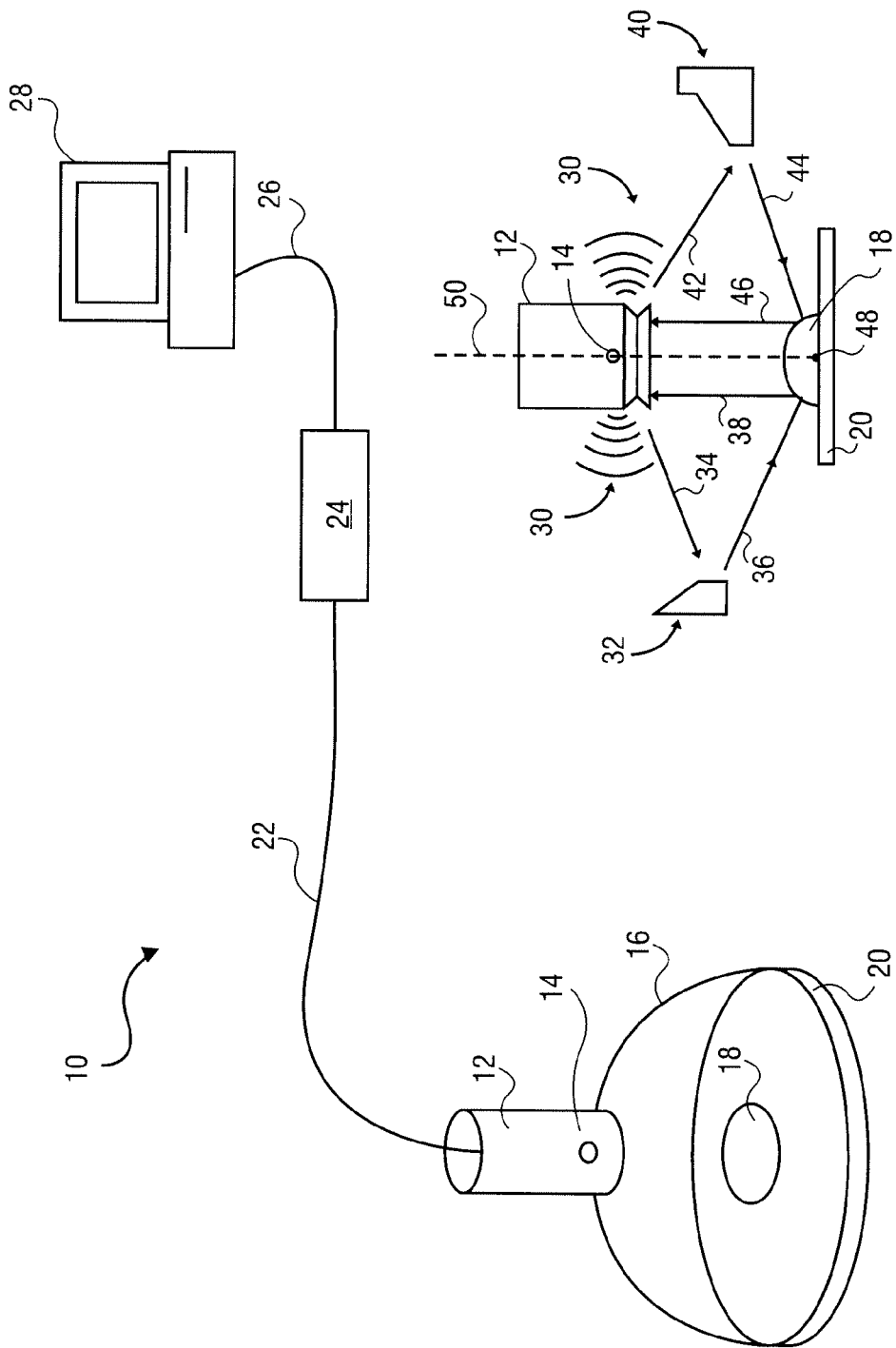

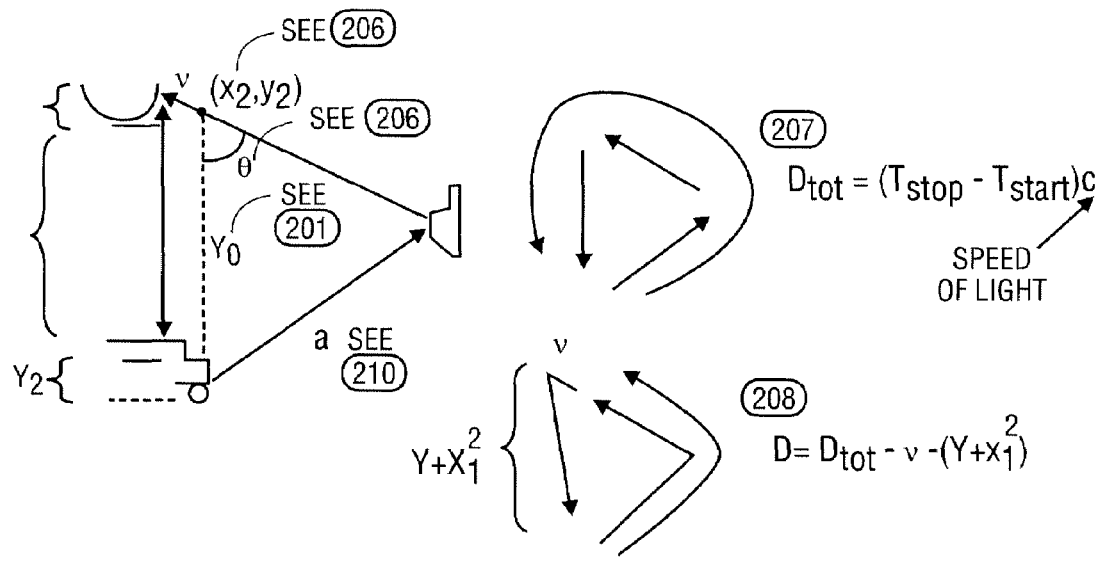
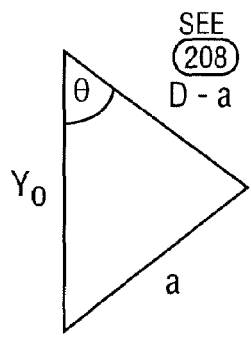
(210) Cosine law
$$a^2 = Y_0^2 + (D-a)^2 - 2Y_0(D-a)\cos\theta$$
$$a = \frac{Y_0 + D - 2Y_0 D \cos\theta}{2(D - Y_0 \cos\theta)}$$
"a" is the distance from the illumination source to a point on the object
FIG. 16

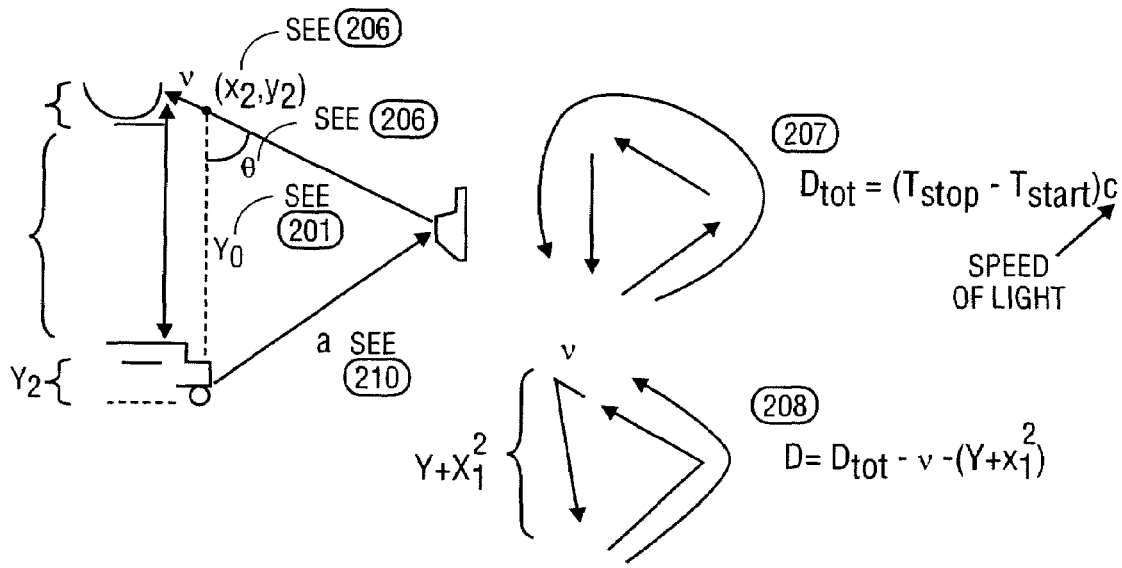
$$D_{tot} = (T_{stop} - T_{start})c \quad \text{SPEED OF LIGHT}$$
$$D = D_{tot} - v - (Y + x_1^2)$$
(209) $Y_0 = Y + y_2 + Y_2$
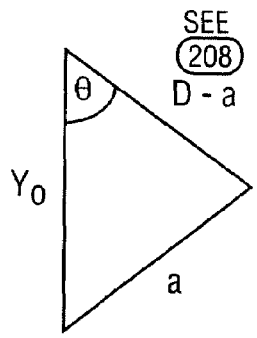
(210) Cosine law
$$a^2 = Y_0^2 + (D-a)^2 - 2Y_0(D-a)\cos\theta$$
$$a = \frac{Y_0 + D - 2Y_0 D \cos\theta}{2(D - Y_0 \cos\theta)}$$
"a" is the distance from the illumination source to a point on the object
FIG. 19

APPARATUS AND METHOD FOR SENSING DEPTH IN EVERY DIRECTION

BACKGROUND

1. Field of the Invention

This invention generally relates to methods and apparatus for sensing images of a hemispherical scene and more particularly to methods and apparatus for automatically and omni-directionally sensing depth information for objects within the hemispherical scene.

2. State of the Art

Surveillance, robotics, teleconferencing, and other applications require that an image sensor receive as much information as possible about the environment surrounding it, but the the camera lenses currently available tend to restrict the image sensors' field of view to less than a full hemisphere. In order to photograph or monitor a fully hemispherical field of view, a wide-angle lens must be used or the camera must be panned or tilted across the sector of interest. Both approaches are disadvantageous. Conventional wide-angle lenses, for example, increase a camera's field of view, but still provide field of view that is less than a full hemisphere. Fish-eye lenses, on the other hand, enable the viewing of an entire hemispherical scene, but have short focal lengths and are more bulky and complex than traditional lenses. Panning and/or tilting the camera about its vertical axis enables the sequential viewing of a hemispherical scene, but consumes significant time when rotating through a 180 degree arc. Panning and tilting systems are further disadvantageous in that they are complex and include moving parts that require regular maintenance.

Often a camera's field of view is increased using planar reflective surfaces that are tilted or panned about a central axis to reflect sequential sectors of a hemispherical scene to a camera. Alternatively, curved reflectors are sometimes used. For example, in one method, a substantially paraboloid-shaped reflector is positioned in front of a camera to orthographically reflect radiation from virtually all points of a hemispherical scene to the camera. An orthographic lens on the camera in this system permits a hemispherical scene to be viewed from a single view point but is disadvantageous because it does not provide a method or apparatus for sensing the depth of objects located in the hemispherical scene. Additionally, panning or tilting a planar reflective surface about a central axis is disadvantageous because only one portion of a hemispherical scene at a time is reflected.

Various apparatus and methods are known in the art for detecting the unidirectional depth of an object located in front of a camera. However, no method or apparatus presently exists for omnidirectionally sensing the depth of one or more objects located within a hemispherical scene that surrounds the camera.

BRIEF DESCRIPTION OF THE DRAWINGS

The present invention is illustrated by way of example, and not limitation, in the figures of the accompanying drawings, in which:

FIG. 1 is a diagram illustrating one embodiment of an image depth sensing system;

FIG. 2. is a side view of an image and depth sensing system, according to one embodiment of the invention;

FIG. 16 is a flowchart of a method used to operate the omnidirectional image and depth sensing system of FIG. 15.

FIG. 19 is a diagram illustrating exemplary application of one embodiment.

DETAILED DESCRIPTION

Figure 3:
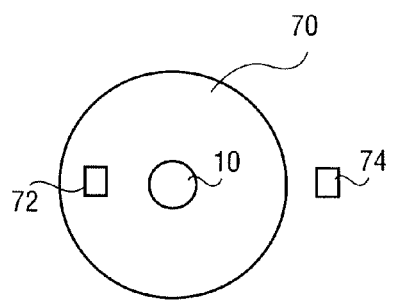
FIG. 3 is a plan view of an image and depth sensing system, according to one embodiment of the invention.

FIG. 1 is a diagram illustrating one embodiment of a system 10 for automatically and omnidirectionally sensing depth information for one or more objects located within a substantially hemispherical scene that surrounds an image sensor 12. By depth information, it is meant that the system 10 automatically detects the presence of one or more objects within the hemispherical scene and automatically calculates the horizontal distance separating each object from a vertical axis passing through the center of the system 10. As shown in FIG. 1, the system 10 includes a range-finding image sensor 12, a radiation source 14, a camera support 16, a substantially paraboloid-shaped reflector 18, a base 20, a transmission link 22, an optional analog-to-digital converter 24, an optional second transmission link 26, and a computer system 28. Each component is described in the paragraphs which follow.

To begin, the image sensor 12 is a range-finding video camera manufactured by 3DV systems of Yok Neam, Israel. The camera and its operation are fully described in U.S. Pat. Nos. 6,091,905 and 6,100,517, which issued to Yahav et al., and are not further described here in order not to overcomplicate the present invention. However, range-finding digital video or digital still cameras such as the one described above, and similar image sensors, are to be construed as being within the scope of the invention as claimed.

Attached to the exterior surfaces of the range-finding image sensor 12 are one or more radiation sources 14 that emit visible or invisible radiation in the form of infrared radiation, laser radiation, or stroboscopic light. Illustratively, each radiation source is a radiation emitting diode. In order to provide coincident areas of coverage, each radiation source 14 is mounted on an exterior surface the camera body near the camera lens. The radiation sources 14 are configured and positioned to pulse radiation simultaneously such that all substantially areas of a hemispherical scene about the system 10 are illuminated at substantially the same time. Additionally, each radiation source is equipped with a digital or mechanical modulator that modulates (e.g. pulses) the waveforms of radiation emitted from its radiation source. Once emitted, the radiation waveforms ripple radially outwardly from the center of the system 10 to illuminate substantially all of the substantially hemispherical scene that surrounds the image and depth sensing system 10.

Supporting the image sensor above the paraboloid-shaped reflector 18 is a camera support 16. Formed of a clear, transparent material, such as glass or high-quality optical plastic, the camera support 16 may take any suitable form. Illustratively, the camera support 16 is shown as being a substantially paraboloid-shaped structure. The camera support 16 is formed of a clear material that allows rays of radiation reflected from objects located within the camera's field of view to impinge the substantially paraboloid-shaped reflector 18. In addition to supporting the camera 18, the camera support 16 functions to keep dust or other contaminants from coating the reflector 18. In other embodiments, the camera support is any support structure that positions the image sensor 12 in line with the substantially paraboloid-shaped reflector 18 such that rays of radiation impinging the reflector 18 are orthographically reflected to the image sensor 12.

The substantially paraboloid-shaped reflector is a reflector such as the one that is fully described in U.S. Pat. Nos. 5,760,826 and 6,118,474, which issued to Nayar. Briefly, the reflector 18 has a substantially paraboloid-shaped plastic body that is coated with a thin layer of reflective material, such as silver or aluminum. The geometry of the substantially paraboloid-shaped reflector satisfies the equation $$Z = \frac{H^2 - R}{2H},$$

where Z is the axis of rotation, R is the radius, and H is a constant. Referring to FIG. 2, the reflector 18 orthographically reflects toward the image sensor 12 incoming rays of radiation 36 and 44 that would otherwise pass through the focus point 48 of the reflector 18. The focus point 48 is coincident with a single view point from which the substantially hemispherical scene is viewed. To recover this focus point, the camera needs an orthographic lens itself.

The reflector 18 rests on a base 20, which is a planar member to which the bottom flat portion of the reflector 18 is mounted.

The image sensor 12 is connected to a computer 28 via the transmission links 22 and 26 such that images received by the image sensor 12 are transmitted to the computer 28 for editing and processing. The transmission link 22 connects the image sensor 12 to the analog-to-digital converter 24, and the transmission link 26 connects the analog-to-digital converter 24 to the computer system 28. The analog-to-digital converter receives analog signals from the image sensor 12, translates the analog signals into digital signals, and transmits the resulting digital signals to the computer 28 for editing and processing. Depending on the embodiment, the transmission links 22 and 26 are wireless connections or physical cable connections.

The computer 28 is a general purpose computer configured to edit and process digital images. Specifically, the computer 28 is configured to calculate the depth information for multiple objects appearing within a hemispherical scene that surrounds the image sensor 12. Additionally, the computer 28 is further configured to unwrap panoramic digital images into either Cartesian or Cylindrical coordinates using algorithms and techniques know to persons of ordinary skill in the art. A diagram of components included in the computer 28 is provided in FIG. 17.

Figure 17:
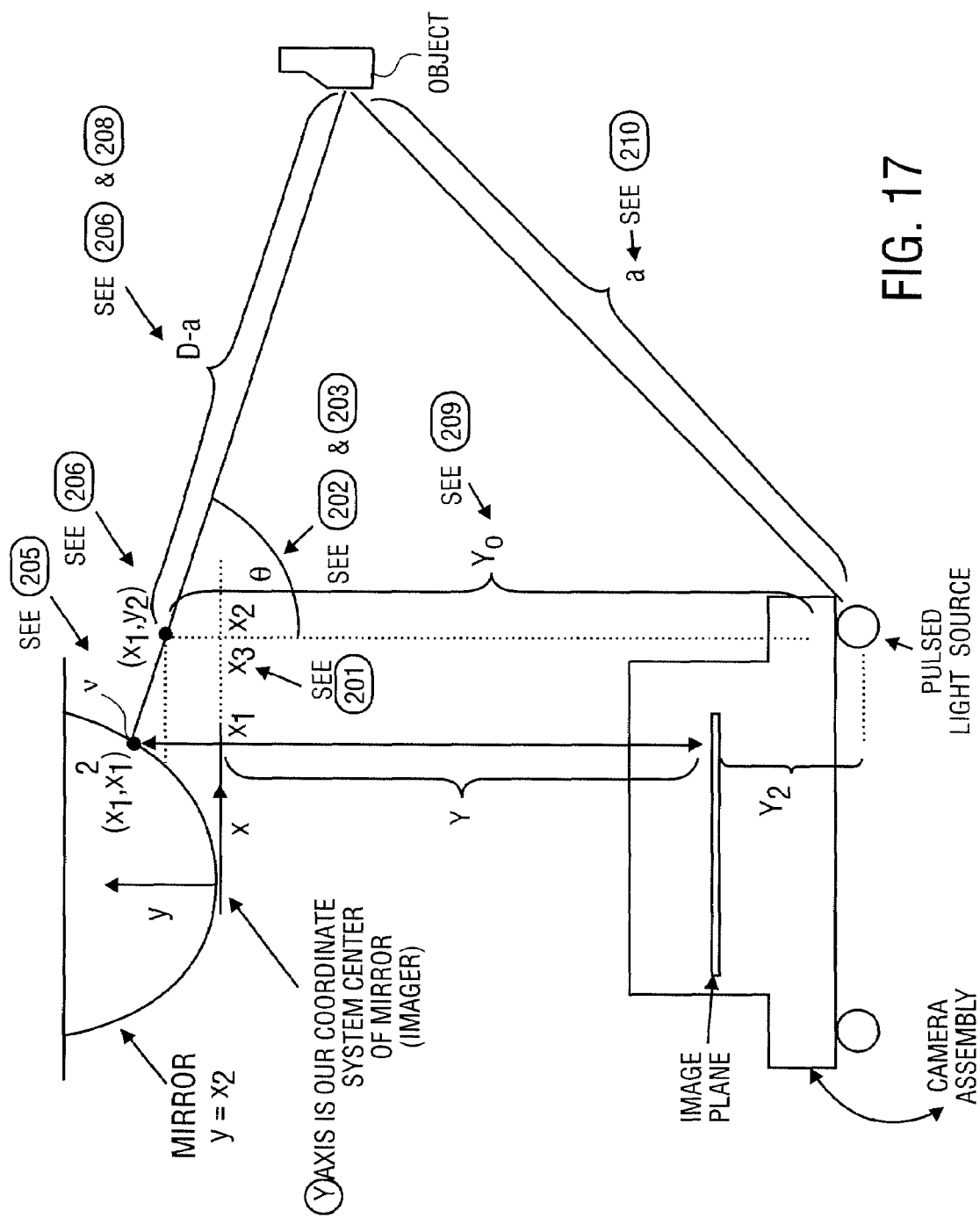
FIG. 17 is a diagram of a computer system usable with an omnidirectional image and depth sensing system, according to one embodiment of the invention.

Referring to FIG. 17, the computer system 28 illustratively includes: a processor 11, a random access memory (RAM) device (hereinafter, main memory) 13, a display device 15, a bus 27, an input device 17, a read only memory (ROM) device 19, a network interface 23, the cursor control device 31, and one or more peripheral devices 25.

The bus 27 connects the processor 11 to the main memory 13. The main memory 13 stores computer executable instructions, which when executed by the processor 11 cause the processor 11 to perform various predetermined tasks. In one embodiment, the main memory 13 is a Random Access Memory (RAM) device. The bus 27 further connects the computer processor 11 and the main memory 13 to the input device 17, the cursor control device 31, the display device 15, and the peripheral devices 25. Illustratively, the processor 11 is a PC-compatible processor manufactured by the Intel Corporation of Santa Clara, Calif.

The ROM device 19 is a read-only memory device such as a floppy disk, a CD-ROM, or a DVD-ROM drive that stores computer executable instructions representing documents, photographs, and other items sent to it by the processor 11 on storage media such as floppy disks, CD-ROM disks, and DVD-ROM disks.

The input device 17 is an alpha-numeric keyboard, a touch pad, a voice-activated controller, or similar device for inputting commands to the processor 11, which commands cause the processor 11 to retrieve and execute the computer executable instructions stored in the main memory 13 and/or in the ROM device 19. The cursor control device 31 is a mouse, a touchpad, or other device for controlling the movement of a cursor that appears on a display device 15, which is connected to the computer system 28.

The display device 15 is a flat panel display or other type of display that presents a graphical user interface (GUI) to a user. Illustratively, the GUI is a Windows GUI manufactured by the Microsoft Corporation of Redmond, Wash. The GUI enables a user to interact with the computer system 28 by manipulating objects appearing on the display device 15 or by entering keystroke, voice, or other commands. The peripheral device 25 is an independent device such as a flatbed scanner, digital camera, or laser printer that removably connects to the computer system 28 to provide added functionality.

An exemplary use of the image and depth-sensing system 10 of FIG. 1 is now described with reference to FIGS. 1 and 2. In use, the radiation sources 14 emit modulated radiation into the substantially hemispherical scene that surrounds the image sensor 12. The emitted radiation spreads radially outwardly from the center of the image sensor 12 to illuminate substantially all of the image sensor's substantially hemispherical field of view. Most of the emitted radiation never returns, but some of the emitted radiation strikes one or more objects 32 and 40 and reflects back toward the image sensor 12. In FIG. 2, the emitted radiation 30 is represented as outbound rays 34 and 42. Ray 34 travels toward and impinges the object 32 located on the left hand side of the image sensor 12, and ray 42 travels toward and impinges the object 40 located on the right hand side of the image sensor 12. Radiation reflected from the objects 32 and 40 is represented as inbound rays 36 and 44. Inbound ray 36 reflects from the object 32, and the inbound ray 44 reflects from the object 40.

The inbound rays 36 and 44 impinge the curved surface of the substantially paraboloid-shaped reflector 18 and are orthographically reflected therefrom toward the orthographic lens of the image sensor 12, which is positioned above the reflector 18 such that a central axis 50 of the image sensor 12 intersects the focal point 48 of the reflector 18.

The image sensor 12 receives the orthographically reflected radiation as rays 38 and 46 and converts the radiation to analog signals that represent both panoramic image data and depth information for each of the objects 32 and 40. Thereafter, the analog signals are transmitted over the communications link 22 to the analog-do-digital converter 24, which translates the analog signals into digital signals and transmits the digital signals to the computer 28 over the communications link 26.

As discussed above, the computer 28 uses predetermined algorithms and software well known to persons skilled in the art to unwrap the panoramic images taken by the camera according to the received image data and depth information. For example, at the moment the rays 38 and 46 impinge the pixel array, a timer started at $T_0$ is stopped (time=$T_{stop}$). The distances to the objects 32 and 40 are then determined using algorithms and mathematical formulas known to persons of ordinary skill in the art. Variables considered in such calculations include: the time between $T_{stop}$ and $T_1$, the speed of light, the distance separating the pixel array from the reflector 18, and the angle at which the incoming rays impinges the reflector 18.

As used herein, the term "unwrap" includes automatically creating a three-dimensional panoramic image of the substantially hemispherical scene in either cartesian or cylindrical coordinates and automatically calculating depth information for one or more objects within the substantially hemispherical scene. The term "unwrap" further includes processing the received image data and depth information to automatically recognize and identify one or more of the objects within the substantially hemispherical scene. The term "unwrap" further includes processing the received image data and depth information to automatically adjust a velocity of the camera to avoid collisions with objects within the substantially hemispherical field of view. The term "unwrap" further includes processing the received image data and depth information to automatically detect an object entering or exiting the substantially hemispherical field of view. Additionally, the computer 28 is configured to allow a user thereof to view any part of, zoom in on, or pan about the substantially hemispherical scene surrounding the image sensor 12 in any manner. Additionally, the computer 28 is configured to create and display three-dimensional depth maps of detected objects on a display device for viewing by a user of the computer 28.

The image sensor 12 is now further described with respect to FIG. 2. In FIG. 2, the image sensor 12 is positioned above a substantially paraboloid-shaped reflector 18 such that a photo-sensitive surface of the camera is perpendicular to an optical axis 50 that extends through the reflector's focus point 48. Inside the image sensor 12 is a planar, charge coupled device (CCD) having an array of radiation sensing pixels. The CCD is positioned within the image sensor 12 such that the pixel array is perpendicular to the optical axis 50. With an orthographic lens, each pixel in the array covers a particular x-y coordinate such that the intensity of the reflected rays of radiation 38 and 46 is sensed at each particular location of the array with a one-to-one correspondence. Once registered by the pixels, the intensity of the reflected radiation reflected from the objects 32 and 40 is then converted into image signals representative of the rays 38 and 46 that were orthographically reflected from the reflector 18. Additionally, the image sensor 12 may include a filter that filters out rays of light that are not orthographically reflected from the reflector 18.

In one embodiment, the range-finding image sensor 12 is configured to define a "distance window" surrounding the system 10 within which one or more objects may be detected.

Figure 4:
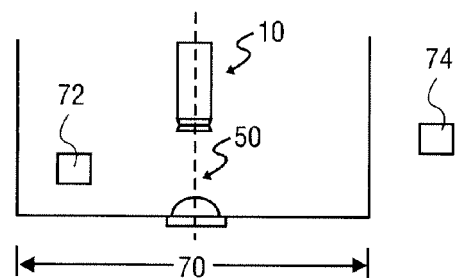
FIG. 4 is a side view of the image and depth sensing system of FIG. 3.

FIGS. 3 and 4 illustrate a first distance window 70 extending radially outward from the optical axis 50 of the system 10. Image data and depth information are obtained for an object 72 located within the first distance window, but not for an object 74 located outside the first distance window 70.

Figure 5:
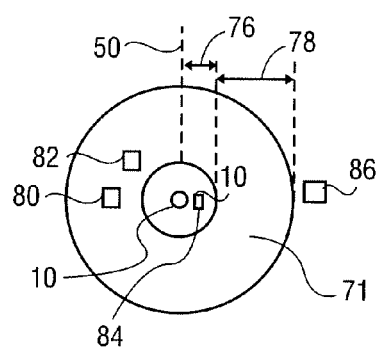
FIG. 5 is a plan view of an image and depth sensing system, according to another embodiment of the invention.
Figure 6:
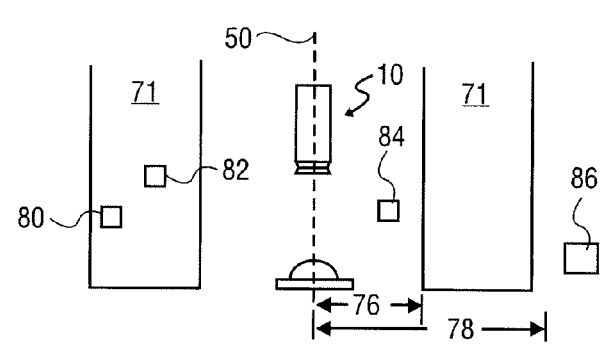
FIG. 6 side view of the image and depth sensing system of FIG. 5.

FIGS. 5 and 6 are plan diagrams of an image and depth sensing system 10 that illustrate a second distance window 71 beginning at a distance 76 from the optical axis 50 and extending radially outwardly to a second distance 78. Image data and depth information are obtained for the objects 80 and 82 located within the second distance window 71, but not for the objects 84 and 86 located outside the distance window 71.

The distance windows 70 and 71 are created by selectively modulating the source radiation and adjusting the time the pixel array can collect reflected radiation, a process which is better illustrated with respect to FIGS. 7-13.

Figure 7:
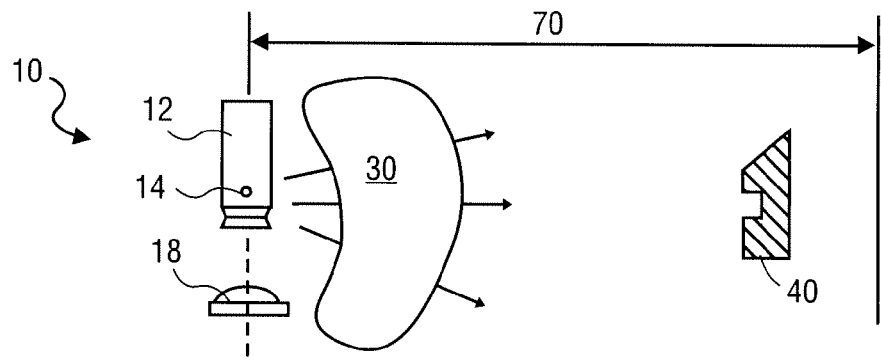
FIGS. 7-9 are time-dependent diagrams illustrating one embodiment of a method and used to form a distance window, according to one embodiment of the invention.
Figure 8:
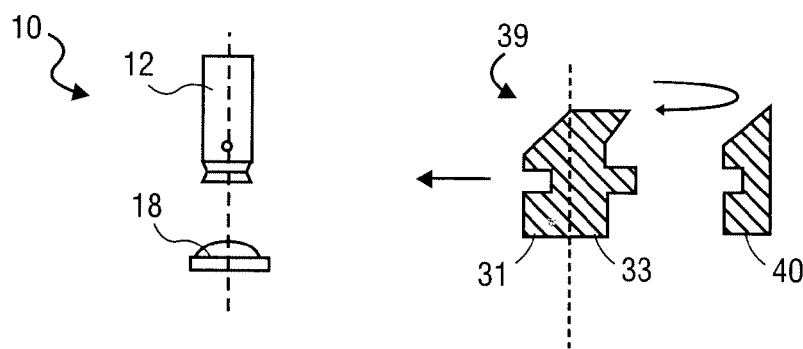
Figure 9:
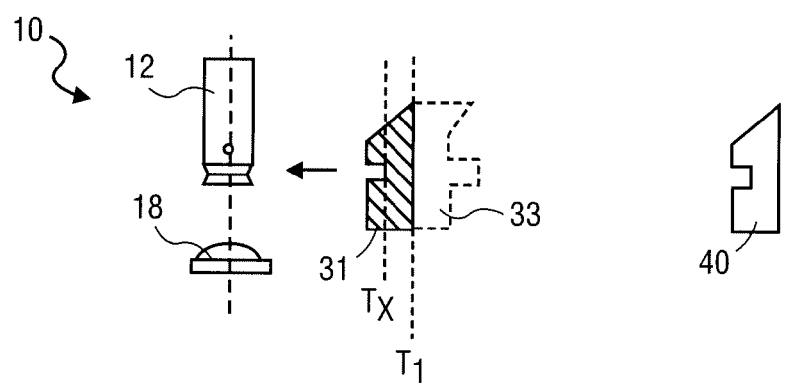

FIGS. 7-9 are time diagrams illustrating creation of the distance window 70 by pulsing infrared radiation 92 between color frames 90 of the red, green, and blue (RGB) range-finding image sensor 12 of FIGS. 1 and 2. At a first time $T_1$, the image sensor 12 captures a color frame 90 (FIG. 7). Immediately thereafter, a light pulse 92 is pulsed into the camera's field of view (FIG. 8). The light pulse 92 has a length sufficient to fill twice the depth of a desired distance window. As soon as the light pulse 92 is emitted, the process repeats as the image sensor 12 captures another color frame (FIG. 9)

The boundaries of the distance window 70 are determined by turning the pixel array on at the time when the front edge of the reflected radiation wavefront could have returned from the nearest boundary of the distance window, and by turning the pixel array off at the time it would take light to traverse the distance between the furthest boundary of the window. The shutter timing is set to only allow the leveling half of the returning wavefront of light to enter the camera.

When illuminated by the radiation source 14, objects within the distance window 70 will reflect emitted radiation back toward the image data and depth sensing system 10. The reflected radiation impinges the reflector 14 and is orthographically reflected to the range-finding image sensor 12 as rays 38 and 41. Normally the camera shutter is set to only allow the leading half wave front of the returning light in. However, due to differing absorption of light by different materials in the environment, the full wave front of light must periodically be let in so that it may be used to normalize out differences in absorption. These full irradiances generate baseline signals $S_1$ that are used to normalize the irradiances $I_1$ of radiation that is reflected back to the image sensor 12 from one or more objects within the distance window. Typically, the pixels are adjusted to saturate if all of the outgoing light pulse bounced back to the pixel array, and the signals $I_1$ and $I_2$ corresponding to the objects 32 and 40 are normalized according to the formula:

$$L_i = \frac{Ihalfwave}{Si} - \frac{li}{Si}$$

Where $I_1$ is the non-normalized signal of the $I^{th}$ object, and $S_1$ is the normalization signal obtained by integrating the full wave front of returning light.

The signals $I_1$ detected by the pixel array for objects within a predefined distance window differ from the baseline signals $S_1$ because the shapes, durations, and time delays of the reflected radiation waveforms are affected by the shapes, material, and distance of the objects 32 and 40. This concept is best illustrated in FIGS. 10-12.

Figure 10:
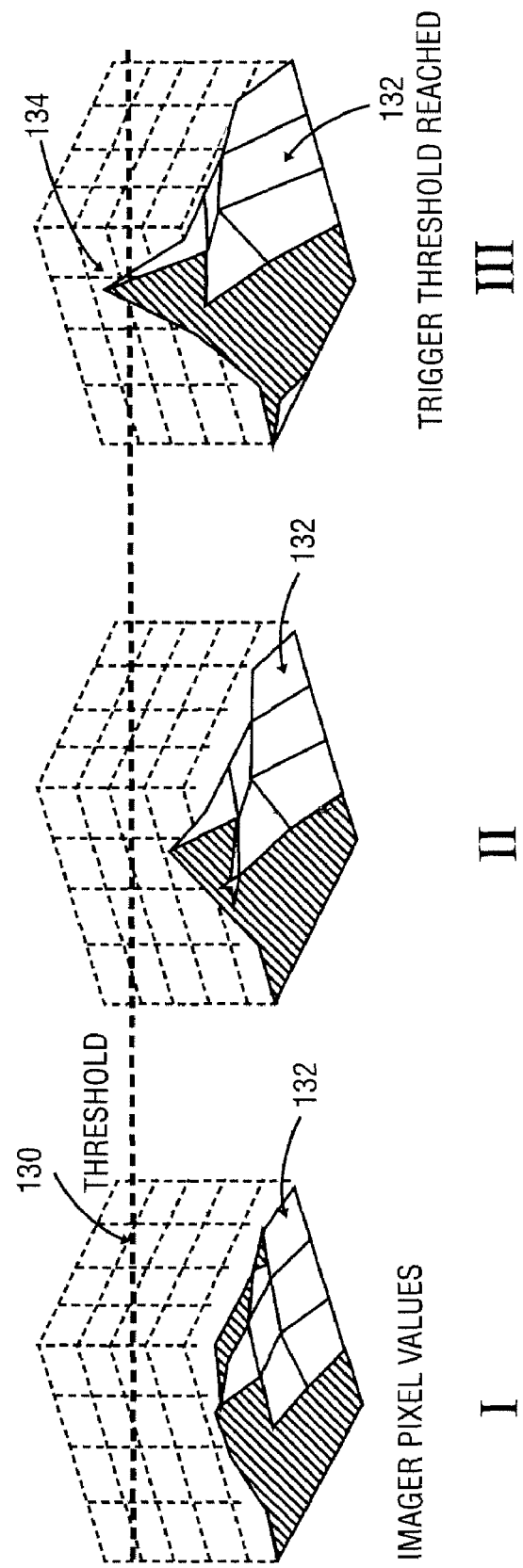
FIGS. 10-12 are time dependent diagrams illustrating capture of an object's depth information, according to one embodiment of the invention.
Figure 11:
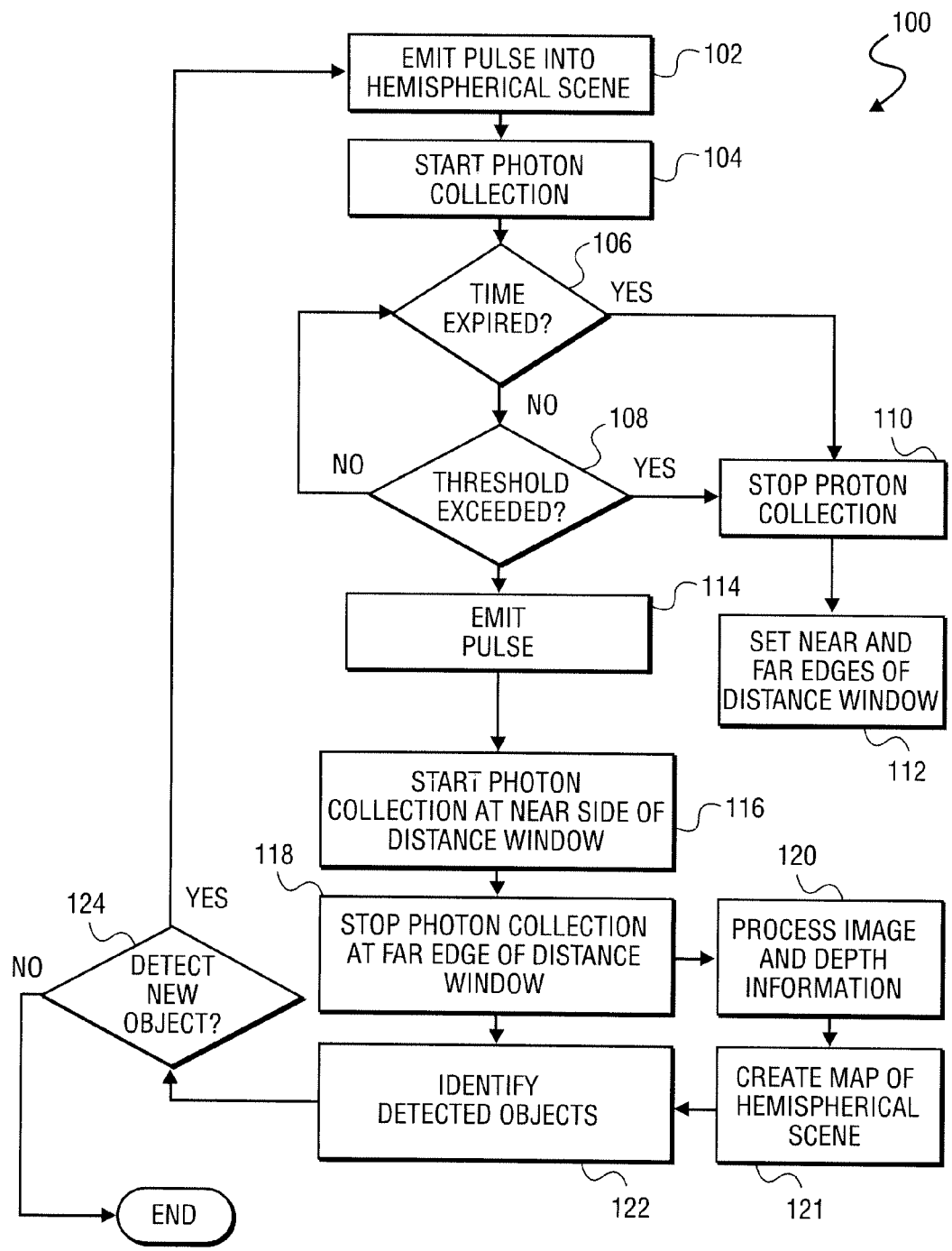
Figure 12:
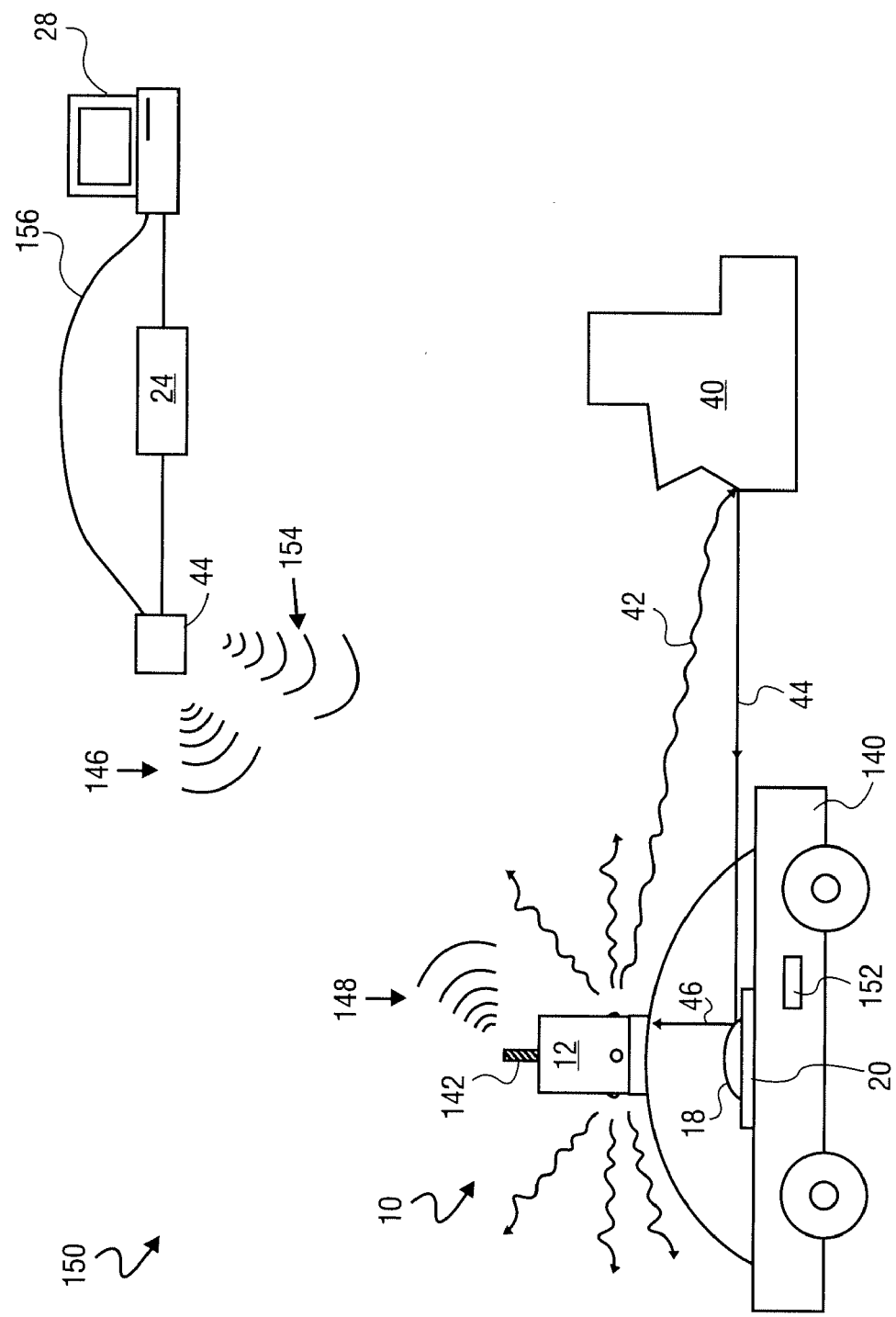

FIGS. 10-12 are diagrams of portions of the imaging and depth sensing system 10 of FIGS. 1 and 2, with the analog-to-digital converter 24, the computer system 28, the transmission links, support structure 16, and object 32 removed to simplify the drawing.

In FIG. 10 a side view of the imaging system 10 is shown. As previously shown and described, the system 10 includes a range sensing image sensor 12, a radiation source 14, and a substantially paraboloid-shaped reflector 18. Although only one portion of a distance window 70 is shown, it is understood that in practice the distance window 70 actually surrounds the image and depth sensing system 10 in three dimensions and encompasses one or more objects in addition to the object 40 shown. Similarly, the radiation 30 is pulsed outwardly from the system 10 in three dimensions simultaneously.

In use, the radiation 30 pulses into a hemispherical field of view surrounding the system 10 and travels toward an object 40 that is partially or wholly contained within the distance window 70. In FIG. 11, the returning wavefront of reflected radiation 39 bounces off of surfaces of the object 40 in depth, e.g. the wavefront 39 includes the shape and depth information of the object 40. Although the wavefront 39 is "bent" into the shape of the object 40, it is of a uniform thickness. Because integrating such a wavefront would produce a pattern of uniform thickness, the camera's pixel array is switched off at a predetermined time such that only the front half 31 of the wavefront 39 is collected (FIG. 11). The back half 33 of the wavefront is discarded. As shown in FIG. 12, the half wavefront of light 31 now carries shape information unique to the object 40. If the pixel array is turned off sooner the wavefront 39 will be collected. Thus, it is possible to measure various depths of object 40 are measured by varying the photon collection start and stop times.

Figure 20:
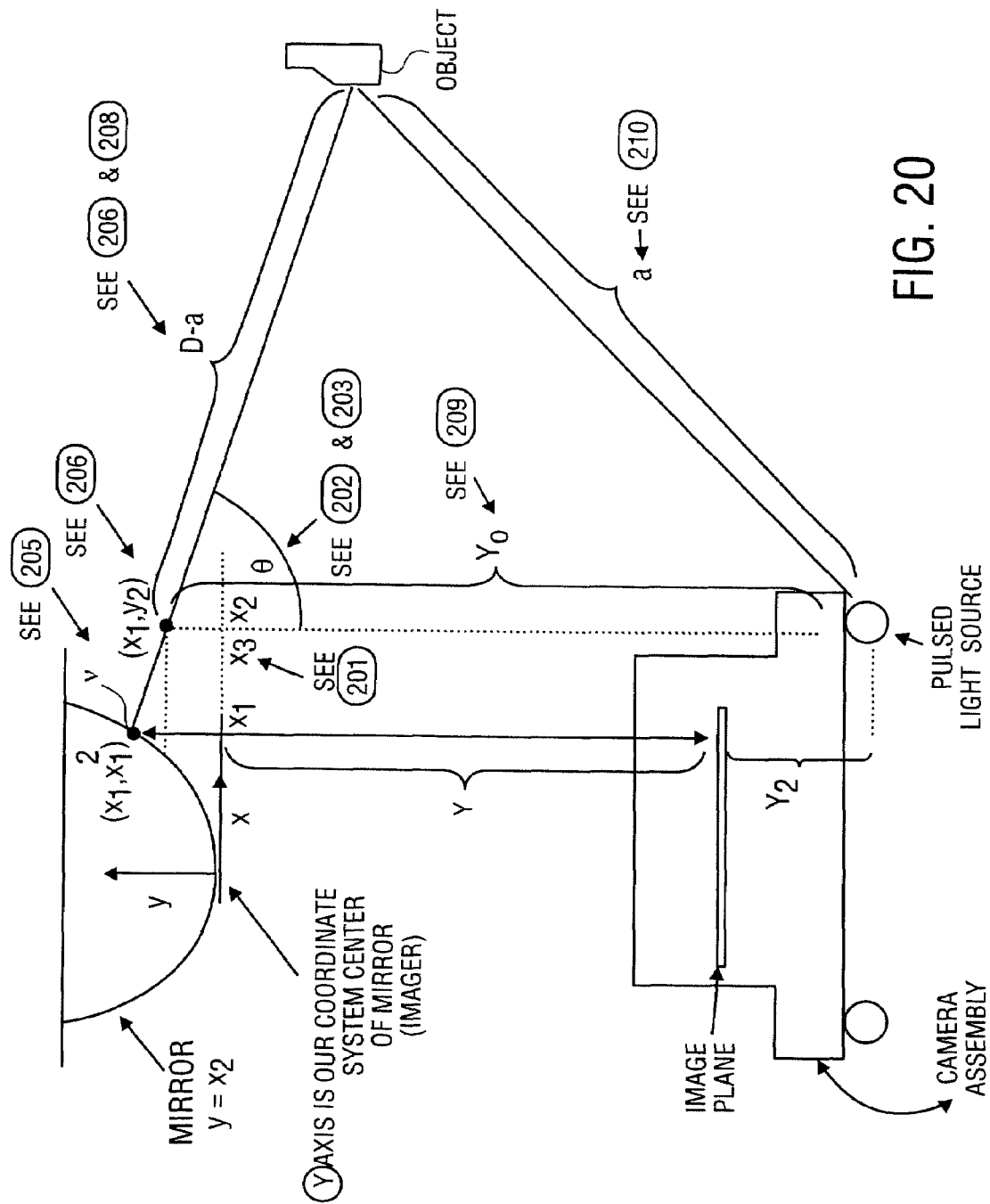
FIG. 20 is a diagram illustrating exemplary application of one embodiment.

A computer system connected to the image sensor 12 converts the integrated shape of the object 40 to actuated depth values (e.g. mm or cm in front of the camera) using the time required for the emitted radiation to impinge the object 40 and reflect back to the image sensor 12. (Illustratively, such calculations are preformed using modified versions of the formula $$d = \frac{c(t-\tau)}{2}$$

where c is the speed of light, t is the end time and τ is the start time). Such modifications and calculations are within the scope of the invention. For example, to find the distance from the illumination source to an object detected within the depth window, we proceed as follows with reference to variables illustrated on FIG. 20. In the example discussed below, one example of a geometry system is discussed, but the same analysis may be done for different geometries by people skilled in the art without departing from the scope of the invention.

Figure 18:
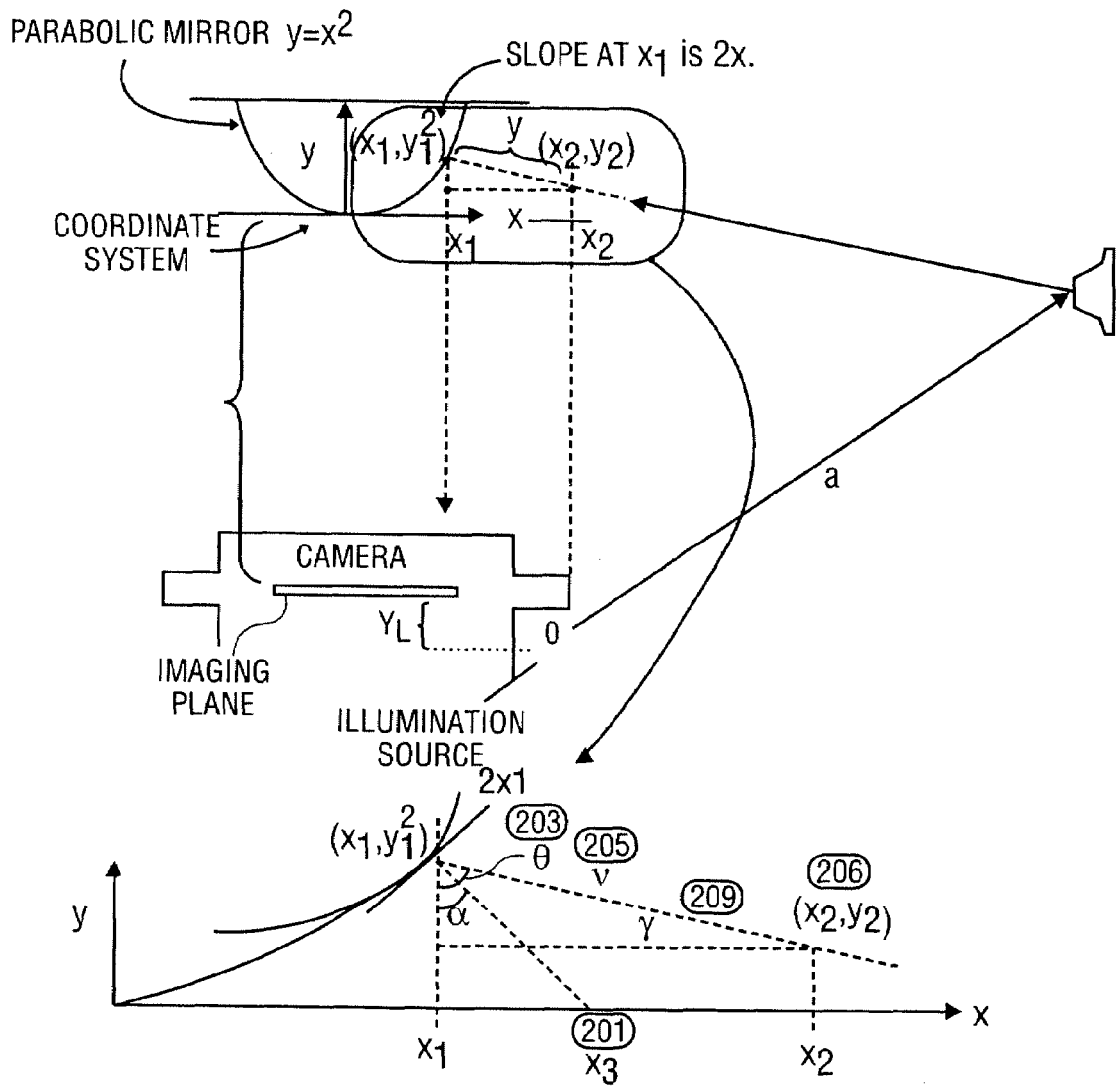
FIG. 18 is a diagram illustrating exemplary application of one embodiment.

With reference to FIG. 18, a parabolic mirror has a functional form $y=x^2$ with respect to an origin system centered at the center of the peak of the mirror. The, measurements are in units of pixels. In the example, a pixel at coordinate x1 from the center was triggered and we want to know the real path length "a" from the illumination source to the object.

By knowing the intercept x1, the location of light ray (x12) is known. Also, by taking the derivative of the surface of the mirror at that point (2x) the slope of the surface of the mirror is known and may therefore calculate the intercept of the normal to the mirror at that point as illustrated in diagram 201 of FIG. 18. From this the angle of the light bounced off the mirror can be calculated as illustrated in diagram 202, of FIG. 18. Twice this amount gives us the total angle the ray of light made in diagram 203 of FIG. 18. By construction, the illumination source is placed at x2. We may then find the angle alpha with respect to the x-axis that the light came in on in diagram 204, of FIG. 18. From this we can calculate how far the light ray travels between passing X2 and hitting the mirror, length r calculated in diagram 205, of FIG. 18. This yields the height above the axis that the light ray passed, y2 found in diagram 206, of FIG. 18.

As shown in diagram 207 of FIG. 19, the path length of the light is calculated from the time the light was turned on, Tstart to the time the pixel detected the light Tstop. This yields the total distance traveled by the light as Dtot=(Tstop−Tstart)c where "c" is the speed of light. The total distance traveled by the light until it bounces back and intersects the x offset of the illumination source at X2 calculated in Diagram 208, of FIG. 19. From construction and calculation of y2 previously, we find the length Y0 in diagram 209, of FIG. 19. Finally, we use the Cosine law to calculate the path length "a" from the illumination source to the object in Diagram 210, of FIG. 19.

It will be appreciated that the unit of measurement (e.g. mm or cm) is limited by the number of bits in the analog-to-digital converter 24. The more bits available, the greater the resolution will be. In one embodiment, the actual read out of the analog-to digital converter at each pixel indicates how far the object 40 is from the near to far edges of the distance window 70.

Figure 13:
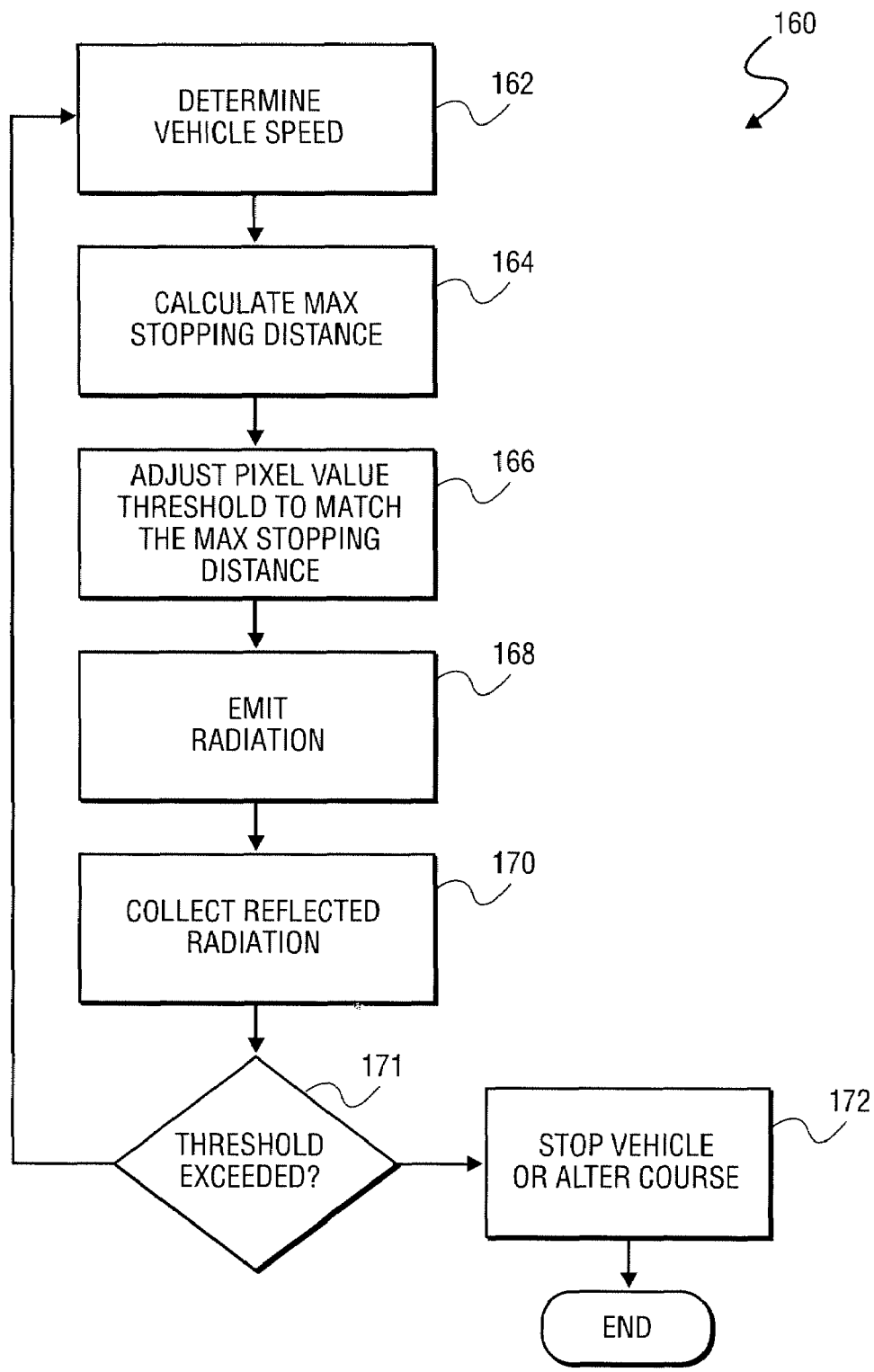
FIG. 13 is a three-part diagram illustrating a pixel value threshold, according to one embodiment of the invention.

FIG. 13 is a three-part diagram illustrating a photon trigger threshold 130 used to detect the presence of objects within a substantially hemispherical scene surrounding an image sensor 12 in FIG. 12 and used to calculated depth information for each object detected. A timer is set when a light pulse is sent out and the trigger threshold, set just above the background noise level of the image sensor, stops the timer when the return pulse exceeds the threshold. Distance to the detected object is then: D=ct/2 where "t" is the time it took for the returning pulse to exceed the threshold and "c" is the speed of light.

Figure 14:
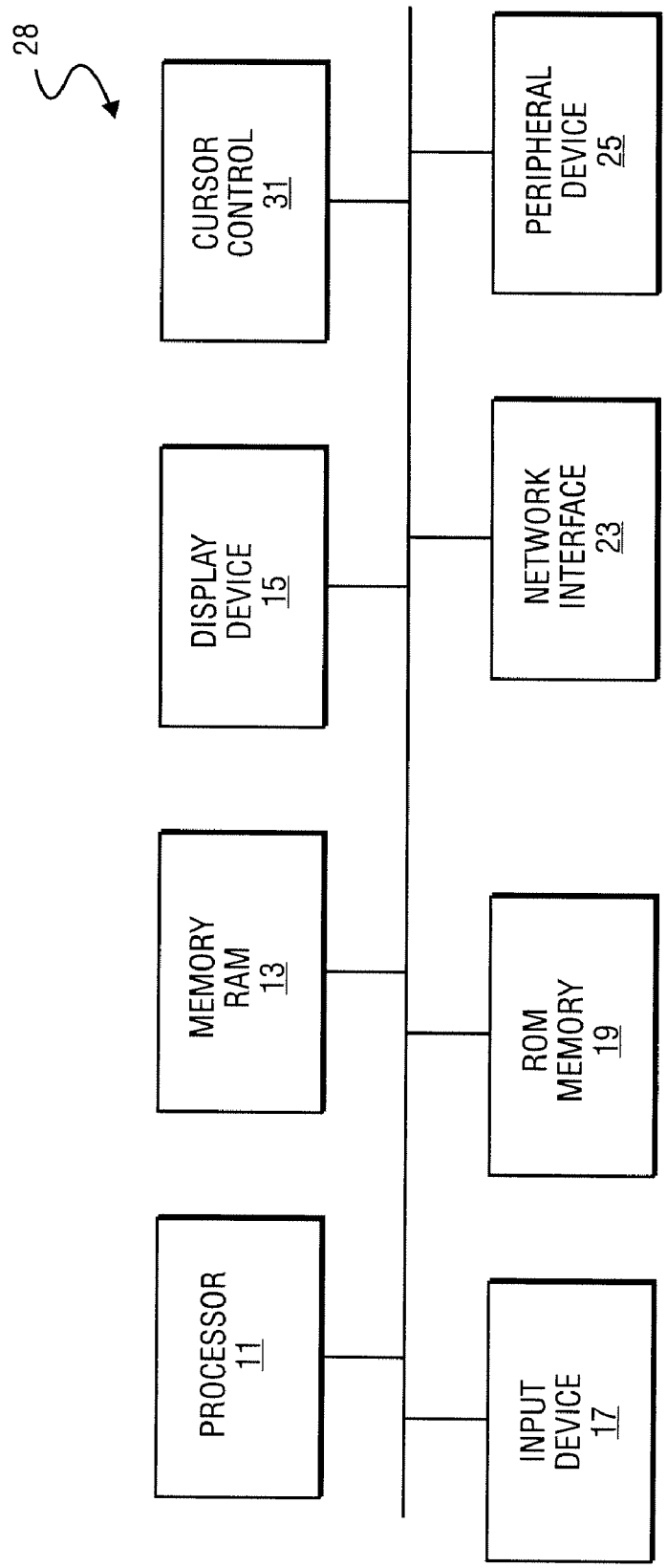
FIG. 14 is a flow chart illustrating a method of sensing depth omnidirectionally, according to one embodiment of the invention.

FIG. 14 is a flow chart illustrating a method used to automatically sense depth omnidirectionally. In (block 102) a light pulse is emitted into a hemispherical field of view. Simultaneously or thereafter, an image sensor is turned on to collect photons (block 104) reflected from the hemispherical scene. The photon collection terminates when either a predetermined amount of time has passed without a threshold being reached or when the threshold is exceeded (block 108). This method is particularly useful when a depth range is not known a priori. An example of a trigger threshold is shown in FIG. 13 as the dashed horizontal line 130.

Once an object (or objects) has been detected within a hemispherical scene, the near and far edges of a distance window are determined based on the initial depth value associated with the trigger threshold (block 112).

Illustratively, the "stop time" $T_{stop}$ corresponding to a far edge of the distance window is calculated based on how deeply into the detected object one wishes to explore. For example, let D represent the initial depth of the detected object. Let d represent the additional depth to be explored past D. And let N represent a fraction of the range found in front of the detected object. D and d may be expressed as predetermined stop times or as physical depth distances converted to the time it takes light to traverse those distances and back. The stop time $T_{stop}$ then becomes $$T_{stop} = \frac{D+2d}{c}$$

The start time $T_{start}$ is established either as $T_{start}=D/c$, the initial depth detected, or as $T_{stop}=(D/c)1-N$, a percentage of the range in front of the initial depth.

After these values are established, radiation is pulsed again into the hemispherical scene (block 114), photon collection is begun at $T_{start}$ (block 116) and ended at $T_{stop}$ (block 118), and the captured image and depth information is processed by the computer 28 (block 120 and FIG. 1) to create a three-dimensional depth map (block 121 and FIG. 12) to identify the detected object. If it is desired to detect new objects (block 124) the method 100 loops back to block 102. Otherwise, the method 100 ends (block 126).

Figure 15:
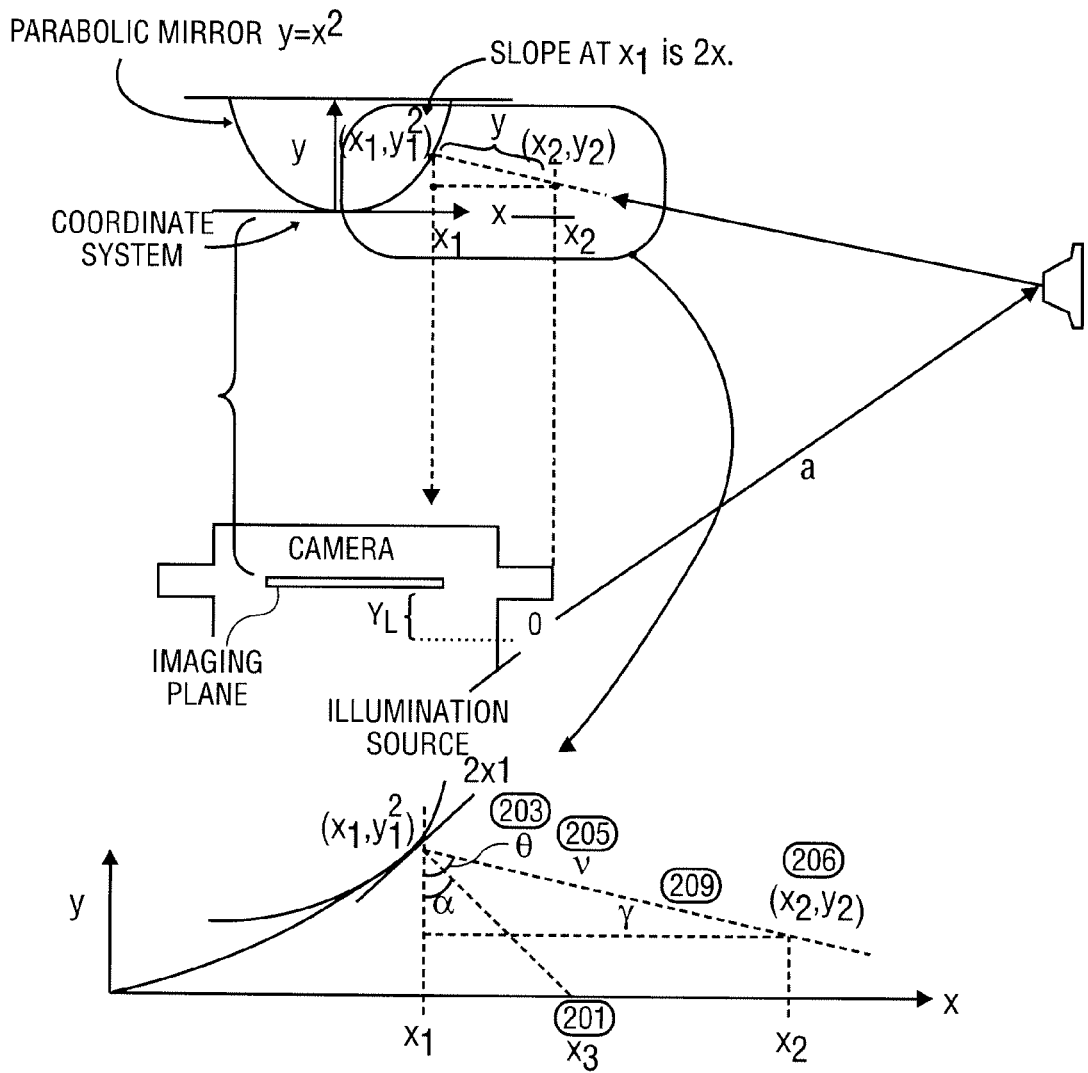
FIG. 15 is a diagram illustrating use of an omnidirectional image and depth sensing system as part of a vehicular collision avoidance system, according to one embodiment of the invention.

In other embodiments, the methods and apparatus described above are used as part of a collision avoidance system for mobile, remotely operated vehicles. FIG. 15 is a diagram illustrating such a system at a high level. The collision avoidance system 150 includes a mobile, remotely controlled vehicle 140, a reflector base 20, a substantially paraboloid-shaped reflector 18, a camera support 16, a radiation source 14, a range-finding image sensor 12, a first wireless transceiver 142, a second wireless transceiver 144, an analog-to digital converter 24, and a computer system 28. With the exception of the mobile vehicle 140 and the wireless transceivers 148 and 146, the components 12, 14, 16, 18, 20, 24, and 28 have been previously described.

The mobile vehicle 140 is easily built by persons of ordinary skill in the art using known components, techniques, and materials. The mobile vehicle 140 includes a chassis, four wheels connected to the chassis, propulsion means, a power source, steering means, and communication means.

The vehicle chassis is formed of a rigid material such as plastic, wood, or metal. The wheels are formed of rubber or other semi-rigid material. A battery operated or gasoline-powered motor serves as the propulsion means. The steering means includes one or more electric motors attached to struts connected to each of the two front wheels. The communication means includes a wireless radio frequency transceiver connected to an onboard analog-to-digital converter and to an onboard computer processor.

As shown, the reflector base 20 and its attached substantially paraboloid-shaped reflector 18 are positioned on an upper surface of the vehicles chassis beneath a transparent camera support 16.

A wireless transceiver 142 connected to the image sensor 12 transmits data signals to a corresponding wireless transceiver 146 over communication link 148, and the wireless transceiver 144 communicates with the wireless communication link 154.

Data signals received by the wireless transceiver 144 from the image sensor 12 are routed to the computer system 28 via an analog-to-digital converter 24. The computer 28 processes the received image and depth information as described above. The computer 28 also monitors the speed and direction of the vehicle 140, as well as the distance separating the vehicle 140 from the object 40.

With reference to FIGS. 15 and 16, a method of collision and avoidance is described. FIG. 16 is a flow chart illustrating one embodiment of a method 160 used to prevent the vehicle 140 from colliding with an object 40. First, the remote computer 28 detects the speed and direction of the vehicle 140 (block 161). This information may be provided by a speedometer and compass that are mounted on the vehicle 140, and which are connected to the computer 28 via the transceiver 152 and the communication link 154.

The computer 28 then calculates the vehicle's maximum stopping distance based on factors such as terrain and weather conditions. This maximum stopping distance is then multiplied by 2 and the result is then divided by the speed of light to yield the time $T_L$ required for light to cover that distance and back. The computer 28 then adjusts the pixel value threshold to correspond to the value of $T_L$.

In use, radiation 30 emitted from the radiation source 14 impinges an object 40 and is reflected to the image sensor 12 (rays 44 and 46 in FIG. 15). The pixel values are then integrated (block 170). If the threshold is reached, then computer 28 instructs the vehicle 140 to slow, to stop, or to alter its direction of motion (block 132). Such computations are performed in real-time or near to real-time.

For security or surveillance applications, the image and depth sensing system 10 is programmed to monitor a selected volume of space. The selected volume of space is a hemispherical scene or any portion thereof. The start integration time $T_{start}$ is set to correspond to the time required for a beam of light to travel to the closest point in the volume of interest and back. The method 100 in FIG. 14 is then employed subject to a maximum stop time $T_{stop}$ which corresponds to the furthest point in the volume of interest. Objects that are too close are automatically ignored because they too early.

By putting two hemispherical depth detection systems together, it will be appreciated that use of the present invention also includes detecting image and depth information omnidirectionally for objects located within a full spherical scene.

The operations described above can be stored in the memory of a computer system as a set of instructions to be executed. In addition, the instructions to perform the operations described above could alternatively be stored on other forms of machine-readable media, including magnetic and optical disks. For example, the operations of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the operations as discussed above could be implemented in computer and/or machine readable media, such as discrete hardware components as large-scale integrated circuits (LSI's), application-specific integrated circuits (ASIC's), firmware such as electrically erasable programmable read-only memory (EEPROM's), and electrical, optical, acoustical.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. An imaging system configured to take panoramic pictures, the imaging system comprising:
    a stationary camera including:
        an image sensor, and
        a range finder associated with the camera, the range finder includes a radiation source to emit the modulated radiation into the field of view of the image sensor such that a portion of the radiation is reflected back to the image sensor from one or more objects within the field of view to provide depth information for objects within a field of view of the image sensor of the stationary camera;
    a processor coupled to receive information from the image sensor and the depth information from the range finder, the processor to compute a 360 depth map for a detected object within a region of interest from the stationary camera according to the depth information and to process pictures taken by the image sensor according to the 360 degree depth map to capture a panoramic picture in one shot;
    a substantially paraboloid-shaped reflector positioned to orthographically reflect a portion of the reflected radiation to the image sensor with an orthographic lens; and
    a timer connected to the processor and configured to start counting when the radiation is first emitted and configured to stop counting when a first portion of the reflected radiation causes a pixel within the image sensor to exceed a predetermined threshold.

2. The imaging system of claim 1, wherein the radiation source emits an infrared radiation.

3. The imaging system of claim 1, wherein the image sensor further includes;
    a filter means positioned to filter out portions of reflected radiation that are not orthographically reflected to the image sensor.

4. The imaging system of claim 1, wherein the predetermined threshold is manually set by a user of the image sensor.

5. The imaging system of claim 1, wherein the predetermined threshold corresponds substantially to a level of ambient light present in the image sensor's operating environment.

6. The imaging system of claim 1, wherein the predetermined threshold is automatically determined by the image sensor.

7. The imaging system of claim 1, wherein a stop time measured by the timer is used by the processor to calculate a distance that separates a detected object in the field of view of the imaging system.

8. The imaging system of claim 1, wherein the camera is positioned along an axis passing through a vertex and through a focus of the substantially paraboloid-shaped reflector.

9. The imaging system of claim 1, wherein the image sensor is a range-finding video camera.

10. A method for sensing depth panoramically, the method comprising:
    establishing a predetermined intensity threshold for one or more imager pixels within a radiation detector, the imager pixels on an image plane corresponding to a direction of interest in space from a stationary camera, the predetermined intensity threshold equal to a predetermined maximum depth to be monitored within the region of interest;
    emitting a modulated radiation into the region of interest of space from the stationary camera such that a portion of the emitted radiation is reflected back toward a position of the detector from objects positioned within the predetermined maximum depth, and such that a portion of the reflected radiation is further orthographically reflected to the detector from a substantially paraboloid-shaped reflector positioned anterior to the detector with an orthographic lens;
    commencing a timer upon an emission of the radiation;
    integrating intensity values of one or more imager pixels within the detector collected during a start collection time and a stop collection time according to the timer;
    stopping the timer after a predetermined time has passed without the predetermined intensity threshold being exceeded, or stopping the timer when an intensity value of one or more of the imager pixels exceeds the predetermined threshold; and
    generating a 360 degree depth map of at least one object detected within the region of interest from the stationary camera according to the integrated intensity values of the imager pixels.

11. The method of claim 10, further comprising:
    calculating the distance to an object detected within the region of interest as c*R/2, where c is the speed of light and R is the time measured by the timer for an imager pixel in the region of interest to exceed the predetermined threshold.

12. The method of claim 11, further comprising:
    establishing a stop integration time equal to, $$\frac{((1+N)*R)}{2}$$

where R is the time measured
by the timer for an imager pixel in the region of interest to exceed the predetermined threshold;
    emitting a modulated radiation into the region of interest in space;
    commencing the timer upon emission of the radiation;
    integrating intensity values of one or more imager pixels within the detector; and
    stopping the timer and integration of imager pixel values when a time equal to ((1+N)*R) is realized.

13. The method of claim 11, further comprising:
    displaying a depth map of the detected object on a display device for a user.

14. The method of claim 11, further comprising:
    tracking a moving object, within the region of interest, by periodically adjusting the stop integration time so as to keep one or more imager pixels that correspond to a nearest point of the object at a predetermined intensity value.

15. A computer-readable storage medium encoded with computer executable instructions, which when executed perform a method comprising:
    establishing a predetermined intensity threshold for one or more imager pixels within a radiation detector, the imager pixels on an image plane corresponding to a direction of interest in space from a stationary camera, the predetermined intensity threshold equal to a predetermined maximum depth to be monitored within the region of interest;
    emitting a modulated radiation into the region of interest of space from the stationary camera such that a portion of the emitted radiation is reflected back toward a position of the detector from objects positioned within the predetermined maximum depth, and such that a portion of the reflected radiation is further orthographically reflected to the detector from a substantially paraboloid-shaped reflector positioned anterior to the detector with an orthographic lens;

commencing a timer upon an emission of the radiation;

integrating intensity values of one or more imager pixels within the detector collected during a start collection time and a stop collection time according to the timer;

stopping the timer after a predetermined time has passed without the predetermined intensity threshold being exceeded, or stopping the timer when an intensity value of one or more of the imager pixels exceeds the predetermined threshold; and generating a 360 degree depth map of at least one object detected within the region of interest from the stationary camera according to the integrated intensity values of the imager pixels.

16. The computer-readable storage medium of claim 15, wherein the generating of the 360 degree depth map comprises:

calculating the distance to the object detected within the region of interest as c*R/2, where c is the speed of light and R is the time measured by the timer for an imager pixel in the region of interest to exceed the predetermined threshold.

17. The computer-readable storage medium of claim 16, wherein the method further comprises:

establishing a stop integration time equal to $$\frac{((1+N)*R)}{2},$$

where R is the time measured by the timer for an imager pixel in the region of interest to exceed the predetermined threshold;

emitting a modulated radiation into the region of interest in space;

commencing the timer upon emission of the radiation;

integrating intensity values of one or more imager pixels within the detector; and stopping the timer and integration of imager pixel values when a time equal to ((1+N)*R) is realized.

18. The computer-readable storage medium of claim 16, wherein the method further comprises:

displaying the 360 degree depth map of the detected object on a display device for a user.

19. The computer-readable storage medium of claim 16, wherein the method further comprises:

tracking a moving object, within the region of interest, by periodically adjusting the stop integration time so as to keep one or more imager pixels that correspond to a nearest point of the object at a predetermined intensity value.

* * * * *